(12) United States Patent
Fujiwara

(10) Patent No.: US 10,443,576 B2
(45) Date of Patent: Oct. 15, 2019

(54) JOINT STRUCTURE AND WIND POWER GENERATION DEVICE

(71) Applicant: JTEKT CORPORATION, Osaka-shi, Osaka (JP)

(72) Inventor: Hideki Fujiwara, Nara (JP)

(73) Assignee: JTEKT CORPORATION, Osaka (JP)

(*) Notice: Subject to any disclaimer, the term of this patent is extended or adjusted under 35 U.S.C. 154(b) by 259 days.

(21) Appl. No.: 15/031,837

(22) PCT Filed: Oct. 23, 2014

(86) PCT No.: PCT/JP2014/078166
§ 371 (c)(1),
(2) Date: Apr. 25, 2016

(87) PCT Pub. No.: WO2015/064457
PCT Pub. Date: May 7, 2015

(65) Prior Publication Data
US 2016/0265515 A1    Sep. 15, 2016

(30) Foreign Application Priority Data

Oct. 28, 2013 (JP) ................................ 2013-223297

(51) Int. Cl.
*F03D 15/10* (2016.01)
*F03D 9/25* (2016.01)
(Continued)

(52) U.S. Cl.
CPC .............. *F03D 15/10* (2016.05); *F03D 9/25* (2016.05); *F03D 15/00* (2016.05); *F03D 80/70* (2016.05);
(Continued)

(58) Field of Classification Search
CPC ... F03D 1/00; F03D 9/25; F03D 15/10; F03D 80/88; F03D 80/70; F16D 41/066; F16D 41/067
(Continued)

(56) References Cited

U.S. PATENT DOCUMENTS 2,410,818 A * 11/1946 Grant, Jr. .............. F16D 41/066
192/114 R
4,613,763 A * 9/1986 Swansen ................. F03D 7/026
290/44

(Continued)

FOREIGN PATENT DOCUMENTS

CN          1617988 A        5/2005
DE   102012102687 A1 * 10/2013 ............. F03D 80/88
(Continued)

OTHER PUBLICATIONS

Oct. 6, 2016 Search Report issued in European Patent Application No. 14762655.0.
(Continued)

*Primary Examiner* — William Kelleher
*Assistant Examiner* — Joseph Brown
(74) *Attorney, Agent, or Firm* — Oliff PLC

(57) ABSTRACT

A joint structure includes: an output side transmission shaft which rotates integrally with an output shaft of a speed increaser; an input side transmission shaft which rotates integrally with an input shaft of the speed increaser; a fixed housing; a bearing; and a one-way clutch which is fitted in the fixed housing. The one-way clutch integrally rotatably connects the output side transmission shaft and the input side transmission shaft under a condition where a rotation speed of the output shaft is higher than a rotation speed of the input shaft, and releases the connection between the output side transmission shaft and the input side transmis-
(Continued)

sion shaft under a condition where the rotation speed of the output shaft is lower than the rotation speed of the input shaft.

5 Claims, 9 Drawing Sheets

(51) Int. Cl.
*F03D 15/00* (2016.01)
*F03D 80/70* (2016.01)
*F03D 80/80* (2016.01)

(52) U.S. Cl.
CPC .... *F03D 80/88* (2016.05); *F05B 2260/40311* (2013.01); *Y02E 10/72* (2013.01); *Y02E 10/722* (2013.01)

(58) Field of Classification Search
USPC ................. 464/41; 192/45.006, 45.008
See application file for complete search history.

(56) References Cited

U.S. PATENT DOCUMENTS

| | | | |
|---|---|---|---|
| 4,887,703 A | 12/1989 | Moore et al. | |
| 5,109,964 A * | 5/1992 | Fukui | F16D 41/086 192/45.002 |
| 5,117,954 A * | 6/1992 | Iga | F16D 41/067 192/42 |
| 6,227,803 B1 | 5/2001 | Shim | |
| 6,588,560 B1 | 7/2003 | Fujiwara | |
| 6,856,042 B1 | 2/2005 | Kubota | |
| 7,956,485 B1 * | 6/2011 | Simnacher | F03B 13/06 290/55 |
| 2002/0148697 A1 | 10/2002 | Muramatsu et al. | |
| 2002/0183147 A1 | 12/2002 | Fujiwara | |
| 2005/0087417 A1 | 4/2005 | Shimomura et al. | |
| 2008/0053778 A1 | 3/2008 | Shimomura et al. | |
| 2008/0223684 A1 * | 9/2008 | Duffey | F16D 43/22 192/105 R |
| 2008/0271967 A1 * | 11/2008 | Nakatani | C10M 169/00 192/45.006 |
| 2009/0183594 A1 | 7/2009 | Usami | |
| 2009/0278361 A1 * | 11/2009 | Okubo | B60W 30/19 290/1 C |
| 2011/0150383 A1 | 6/2011 | Yoshida et al. | |
| 2011/0187119 A1 * | 8/2011 | McMaster | F03D 9/02 290/55 |
| 2012/0045335 A1 | 2/2012 | Heidenreich et al. | |
| 2012/0201679 A1 | 8/2012 | Heidenreich et al. | |
| 2013/0062886 A1 | 3/2013 | Fujiwara et al. | |
| 2013/0278100 A1 | 10/2013 | Fujiwara | |
| 2013/0283949 A1 | 10/2013 | Fujiwara | |
| 2014/0090945 A1 | 4/2014 | Fujiwara et al. | |
| 2015/0061436 A1 | 3/2015 | Fujiwara et al. | |
| 2016/0010629 A1 | 1/2016 | Fujiwara et al. | |

FOREIGN PATENT DOCUMENTS

| | | | | |
|---|---|---|---|---|
| EP | 1101978 A1 | 5/2001 | | |
| EP | 2657521 A2 | 10/2013 | | |
| EP | 2657560 A2 | 10/2013 | | |
| EP | 2716909 A2 | 4/2014 | | |
| EP | 3002456 A1 * | 4/2016 | ............. | F03D 80/88 |
| JP | S61-228272 A | 10/1986 | | |
| JP | H01-68901 U | 5/1989 | | |
| JP | H02-245525 A | 10/1990 | | |
| JP | H04-344198 A | 11/1992 | | |
| JP | 2001-349335 A | 12/2001 | | |
| JP | 2002-310200 A | 10/2002 | | |
| JP | 2003336571 A * | 11/2003 | ............... | F03D 9/25 |
| JP | 2004-339953 A | 12/2004 | | |
| JP | 2006-183755 A | 7/2006 | | |
| JP | 2006-250034 A | 9/2006 | | |
| JP | 2006-275036 A | 10/2006 | | |
| JP | 2007-232186 A | 9/2007 | | |
| JP | 2009-168181 A | 7/2009 | | |
| JP | 2010-112213 A | 5/2010 | | |
| JP | 2010-180932 A | 8/2010 | | |
| JP | 2013-060825 A | 4/2013 | | |
| JP | 2013-076395 A | 4/2013 | | |
| JP | 2014-173547 A | 9/2014 | | |
| WO | 2012/173139 A1 | 12/2012 | | |

OTHER PUBLICATIONS

Nov. 22, 2016 Office Action issued in Japanese Patent Application No. 2013-048628.
Nov. 22, 2016 Office Action issued in Japanese Patent Application No. 2013-048602.
Jun. 10, 2014 International Search Report issued in International Patent Application No. PCT/JP2014/055411.
Jun. 10, 2014 International Search Report issued in International Patent Application No. PCT/JP2014/055417.
Dec. 22, 2014 International Search Report issued in International Patent Application No. PCT/JP2014/078166.
U.S. Appl. No. 14/773,847, filed Sep. 9, 2015 in the name of Hideki Fujiwara.
U.S. Appl. No. 14/774,188, filed Sep. 10, 2015 in the name of Hideki Fujiwara.
Jun. 21, 2017 Search Report issued in European Patent Application No. 14858362.8.
Jul. 31, 2017 Office Action issued in Chinese Patent Application No. 201480014495.1.
Oct. 17, 2016 Partial Supplementary Search Report issued in European Patent Application No. 14763635.1.
Mar. 8, 2019 U.S. Office Action issued in U.S. Appl. No. 14/773,847.
Mar. 21, 2019 Office Action issued in U.S. Appl. No. 14/774,188.

* cited by examiner

JOINT STRUCTURE AND WIND POWER GENERATION DEVICE

TECHNICAL FIELD

Aspects of the present invention relate to a joint structure used for a wind power generation device, and the wind power generation device.

BACKGROUND ART

As a wind power generation device, there is known a device including: a power generator having a blade that rotates by receiving wind power, a main shaft connected to the blade, a speed increaser that increases the rotation speed of the main shaft and an input shaft coupled to the output shaft of the speed increaser through a joint device; and a nacelle equipped with these. In this wind power generation device, the blade receives wind power to rotate the main shaft, and the speed of the rotation of the main shaft is increased by the speed increaser to drive the power generator, whereby power generation is performed.

In the speed increaser of this wind power generation device, a roller bearing that rotatably supports the output shaft rotating at high speed is provided, and the roller bearing has a problem in that the life is shortened by smearing (a phenomenon in which surface seizure occurs) occurring on the rolling surface of the roller and the raceway surfaces of the rotating rings such as the inner ring and the outer ring. Accordingly, the inventor of the present application made earnest researches on the occurrence mechanism of the smearing, found that provision of a one-way clutch in the joint device between the output shaft of the speed increaser and the input shaft of the power generator is effective in suppressing the occurrence of the smearing, and has already proposed an invention related thereto (see Patent Document 1).

RELATED ART DOCUMENTS

Patent Documents

Patent Document 1: JP-A-2013-76395

SUMMARY OF THE INVENTION

Problem to be Solved by the Invention

In the background art, the structure is as follows: The output shaft protrudes from the main unit of the speed increaser like a cantilever, the input shaft also protrudes from the main unit of the speed increaser like a cantilever, and the one-way clutch is provided on the joint device between these shafts. Since the weight of the joint device increases as well as the structure is like this, the stress and the mechanical load on the joint device and the one-way clutch increase. For example, there is a problem in that the joint device largely bends at the part of the one-way clutch to apply a heavy mechanical load to the one-way clutch and the like and the operation of the one-way clutch and the like lacks in smoothness.

Accordingly, an object of aspects of the present invention is to provide a joint structure used for a wind power generation device in which a high mechanical load is prevented from being applied to the one-way clutch and the like so that the one-way clutch and the like operate smoothly, and the wind power generation device.

Means for Solving the Problem

A first aspect of the present invention contains a joint structure used for a wind power generation device that generates power by rotating an input shaft of a power generator by a torque from an output shaft of a speed increaser, the joint structure including: an output side transmission shaft which rotates integrally with the output shaft; an input side transmission shaft which rotates integrally with the input shaft; a fixed housing fixed to a structural object of a machine room where the speed increaser and the power generator are placed; a bearing which supports, by the fixed housing, the output side transmission shaft and the input side transmission shaft inserted in the fixed housing; and a one-way clutch which is fitted in the fixed housing, which integrally rotatably connects the output side transmission shaft and the input side transmission shaft, and which releases the connection, wherein the one-way clutch integrally rotatably connects the output side transmission shaft and the input side transmission shaft under a condition where a rotation speed of the output shaft is higher than a rotation speed of the input shaft, and releases the connection between the output side transmission shaft and the input side transmission shaft under a condition where the rotation speed of the output shaft is lower than the rotation speed of the input shaft.

According to the first aspect of the present invention, the load of the one-way clutch can be sufficiently supported through the bearing by the fixed housing fixed to the structural object of the machine room of the wind power generation device. Therefore, the joint structure can be prevented from largely bending at the part of the one-way clutch to apply a high mechanical load to the one-way clutch and the like, so that the one-way clutch and the like can be smoothly operated.

A second aspect of the present invention contains the joint structure according to the first aspect, wherein the output side transmission shaft and the input side transmission shaft are disposed concentrically with each other, and wherein the output side transmission shaft and the input side transmission shaft are separately supported by the fixed housing through an output side transmission shaft bearing and an input side transmission shaft bearing, respectively.

A third aspect of the present invention contains the joint structure according to the first or the second aspect described above, wherein the one-way clutch includes: an inner ring portion which rotates integrally with one of the output side transmission shaft and the input side transmission shaft; an outer ring fixed to the other of the output side transmission shaft and the input side transmission shaft; and an engagement element disposed between the inner ring portion and the outer ring, and wherein the outer ring includes: a radially extending portion which extends outward in a radial direction from the other shaft; and an axially extending portion which extends in an axial direction from an end portion of the radially extending portion on an outer side in the radial direction and which faces the inner ring portion in the radial direction.

A fourth aspect of the present invention contains a wind power generation device including: a main shaft which rotates by wind power; a speed increaser which increases a rotation speed of the main shaft and outputs a rotation from an output shaft; the power generator which includes an input shaft rotating with the rotation of the output shaft as an input, and which generates power with the rotation of the input shaft; and the joint structure according to any of the first to third aspects, which is provided between the output shaft and the input shaft and for enabling a torque to be transmitted between the output shaft and the input shaft.

Advantages of the Invention

According to a aspect of the present invention, the load of the one-way clutch can be sufficiently supported through the bearing by the fixed housing fixed to the structural object of the machine room of the wind power generation device. Therefore, the joint device can be prevented from largely bending at the part of the one-way clutch to apply a high mechanical load to the one-way clutch and the like, so that the one-way clutch and the like can be smoothly operated.

MODE FOR CARRYING OUT THE INVENTION

Hereinafter, an embodiment of the present invention will be described with reference to the attached drawings.

Figure 1:
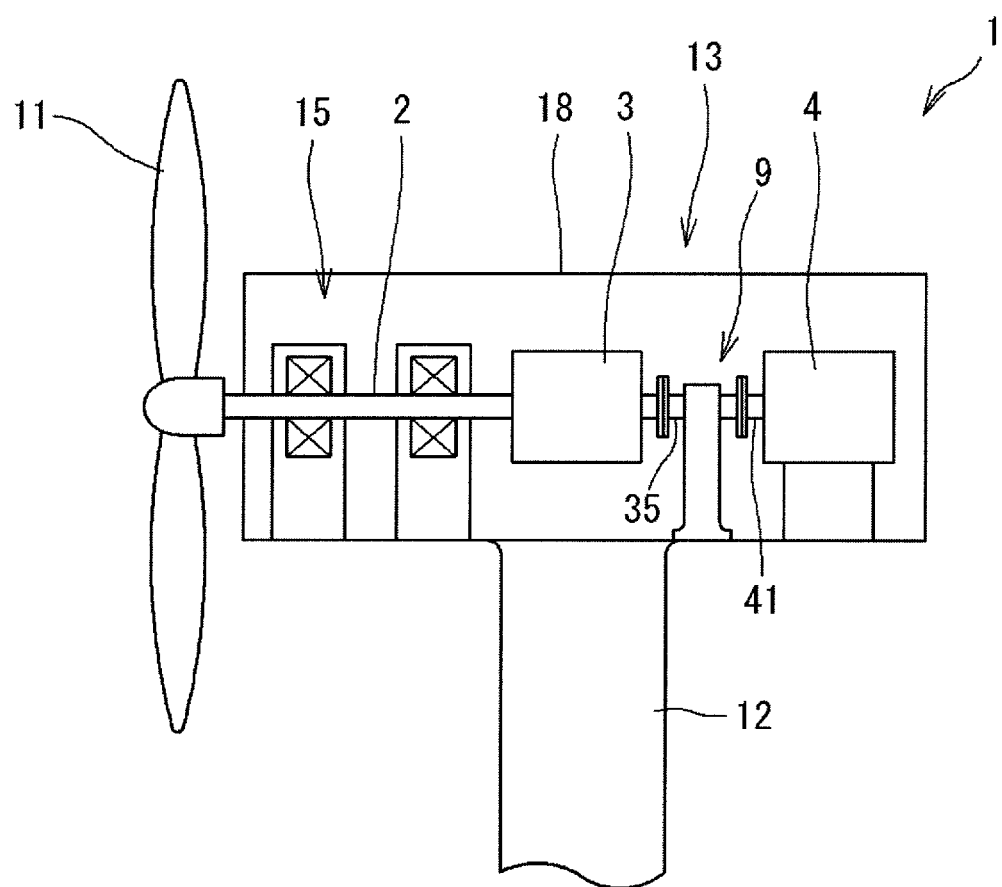
FIG. 1 is a schematic side view of a wind power generation device provided with a joint device according to an embodiment of the present invention.

FIG. 1 is a schematic side view of a wind power generation device 1 provided with a joint structure according to the embodiment of the present invention. The wind power generation device 1 has a structure in which an input shaft 41 of a power generator 4 is rotated by the torque from an output shaft 35 of a speed increaser 3 to thereby generate power, and the joint structure according to the embodiment of the present invention is used for this wind power generation device 1.

Further describing this structure, the wind power generation device 1 is provided with a blade (wind receiving member) 11, a strut 12 and a nacelle 13. The blade 11 is formed of a plurality of blades provided at an end of a main shaft 2, and rotates the main shaft 2 by receiving wind. The nacelle 13 is provided with the main shaft 2, a support mechanism 15 for supporting the main shaft 2, the speed increaser 3 that increases the rotation speed of the main shaft 2, the power generator 4 that generates power by the rotation power increased in speed by the speed increaser 3, a casing 18 accommodating these, and the like. The strut 12 supports the nacelle 13 in such a manner that it can rotate horizontally about the shaft center in the vertical direction.

Figure 2:
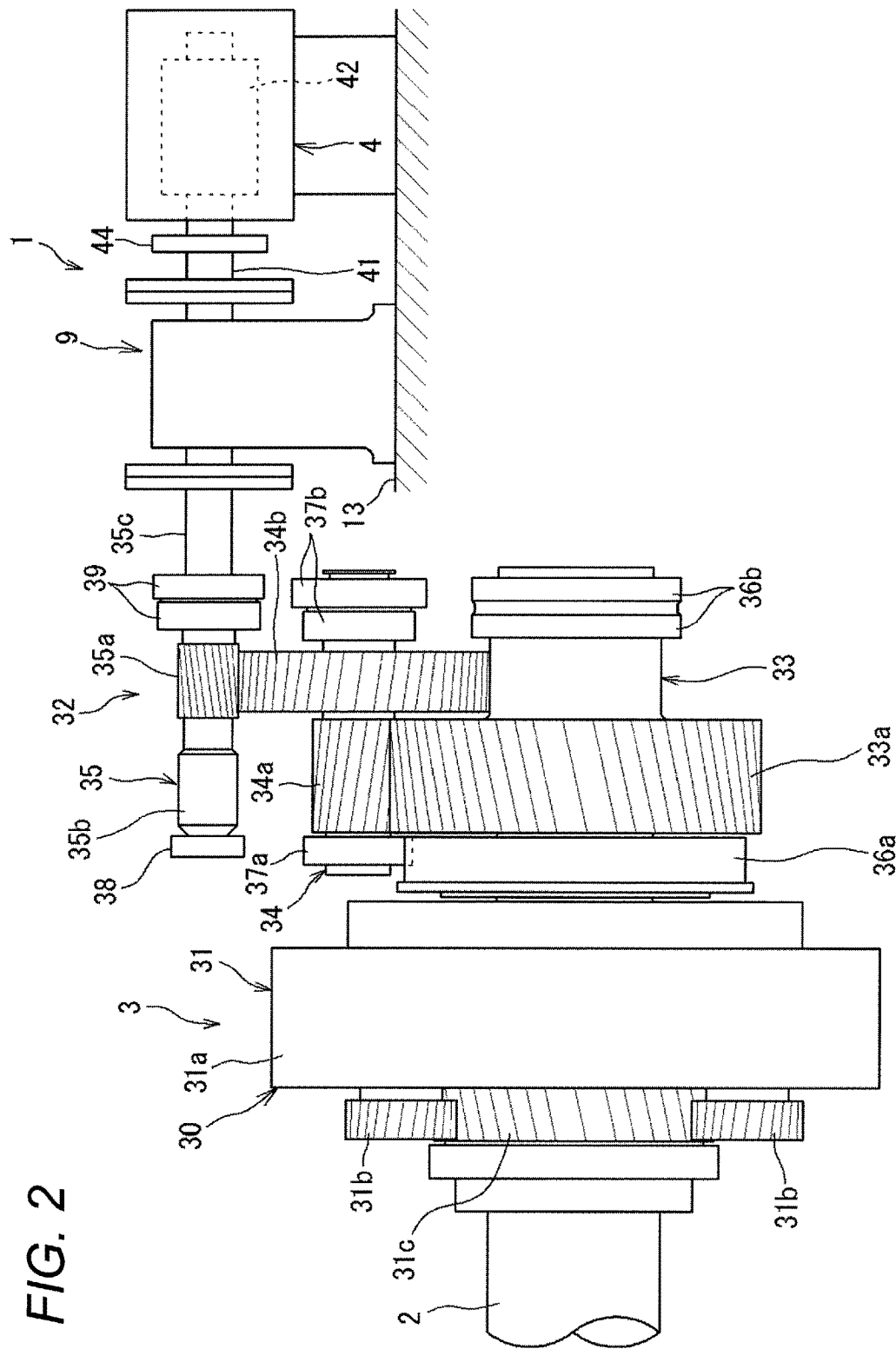
FIG. 2 is a schematic side view showing a speed increaser and a power generator.

FIG. 2 is a schematic side view showing the speed increaser 3 and the power generator 4. The power generator 4 is formed of, for example, an induction power generator, and has the input shaft 41 that rotates by receiving the rotation increased in speed by the speed increaser 3, a rotor 42 incorporated in the power generator 4, a non-illustrated stator, and the like. The rotor 42 is coupled to the input shaft 41 in such a manner that it is rotatable integrally therewith, and the power generator 4 generates power as the input shaft 41 rotates to drive the rotor 42. Moreover, the input shaft 41 is provided with a brake 44 for braking the input shaft 41.

The speed increaser 3 is provided with a gear mechanism (rotation transmission mechanism) 30 that receives the rotation of the main shaft 2 and increases the rotation in speed. The gear mechanism 30 is provided with a planet gear mechanism 31 and a high-speed stepped gear mechanism 32 that receives the rotation increased in speed by the planet gear mechanism 31 and further increases the rotation in speed.

The planet gear mechanism 31 has an internal gear (ring gear) 31$a$, a plurality of planet gears 31$b$ held by a planet carrier (not shown) coupled to the main shaft 2 in such a manner that it is rotatable integrally therewith, and a sun gear 31$c$ meshing with the planet gears 31$b$. Thereby, when the planet carrier rotates together with the main shaft 2, the sun gear 31$c$ rotates through the planet gears 31$b$, and the rotation is transmitted to a low-speed shaft 33 of the high-speed stepped gear mechanism 32.

The high-speed stepped gear mechanism 32 is provided with the low-speed shaft 33 having a low-speed gear 33$a$, an intermediate shaft 34 having a first intermediate gear 34$a$ and a second intermediate gear 34$b$, and the output shaft 35 having a high-speed gear 35$a$.

The low-speed shaft 33 is formed of a large-size rotation shaft the diameter of which is, for example, approximately 1 m, and is disposed concentrically with the main shaft 2. Both end portions of the low-speed shaft 33 in the axial direction are rotatably supported by rolling bearings 36$a$ and 36$b$.

The intermediate shaft 34 is disposed parallel to the low-speed shaft 33, and both end portions thereof in the axial direction are rotatably supported by rolling bearings 37$a$ and 37$b$. The first intermediate gear 34$a$ of the intermediate shaft 34 meshes with the low-speed gear 33$a$, and the second intermediate gear 34$b$ meshes with the high-speed gear 35$a$.

The output shaft 35 is disposed parallel to the intermediate shaft 34, and outputs a running torque. The sides of one end portion 35$b$ and the other end portion (output end portion) 35$c$ of the output shaft 35 in the axial direction are rotatably supported by roller bearings 38 and 39, respectively.

By the above structure, the rotation of the main shaft 2 is increased in speed in three steps by the gear ratio of the planet gear mechanism 31, the gear ratio between the low-speed gear 33$a$ and the first intermediate gear 34$a$ and the gear ratio between the second intermediate gear 34$b$ and the high-speed gear 35$a$, and is outputted as a rotation from the output end portion 35$c$ of the output shaft 35. That is, the rotation of the main shaft 2 by wind power is increased in speed in three steps by the speed increaser 3, is outputted from the output shaft 35, and drives the power generator 4 by the running torque of the output shaft 35.

Figure 3:
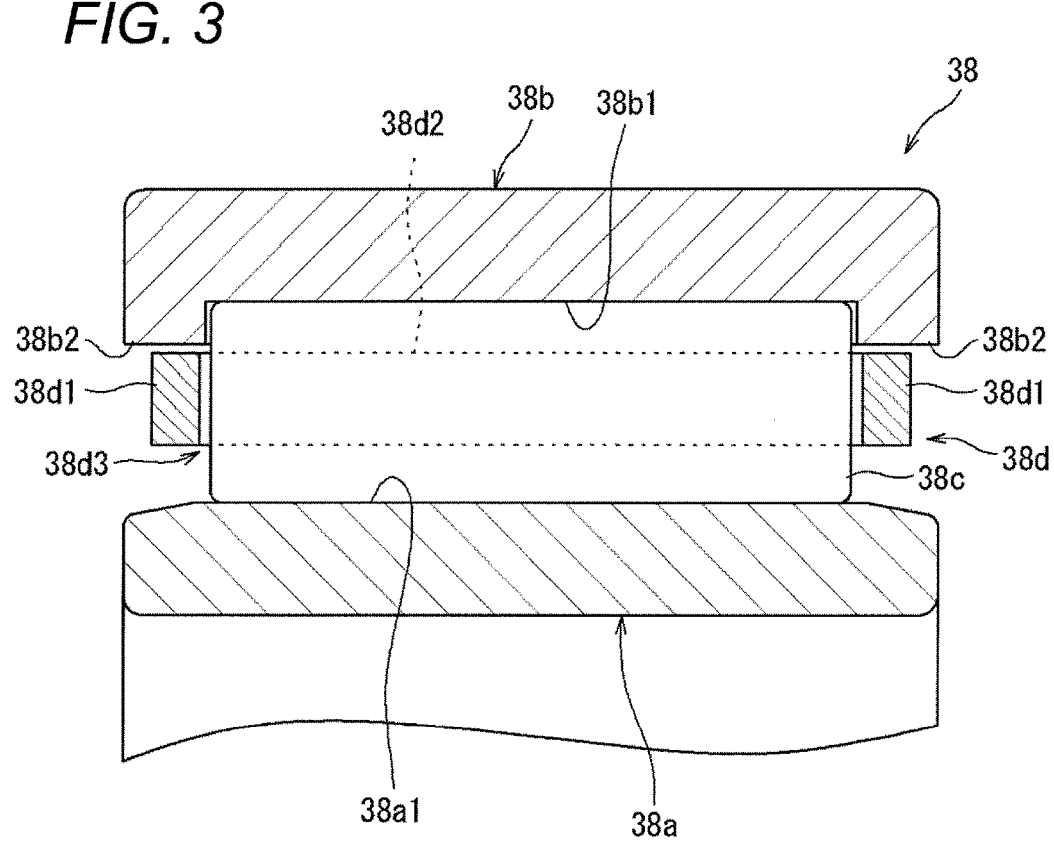
FIG. 3 is a cross-sectional view showing a roller bearing of the speed increaser.

FIG. 3 is a cross-sectional view showing the roller bearing 38 of the speed increaser 3. The roller bearing 38 is formed of a cylindrical roller bearing, and is provided with an inner ring 38$a$ externally fitted and fixed onto the output shaft 35, an outer ring 38$b$ fixed to a housing 14 of the speed increaser 3, a plurality of cylindrical rollers 38$c$ disposed between the inner ring 38a and the outer ring 38b in such a manner that it is rollable, and a ring-shaped cage 38d holding the cylindrical rollers 38c at predetermined intervals in the circumferential direction. The inner ring 38a, the outer ring 38b and the cylindrical rollers 38c are made of, for example, bearing steel, and the cage 38d is made of, for example, a copper alloy.

The inner ring 38a has an inner ring raceway surface 38a1 formed in a central part of its outer periphery in the axial direction. The outer ring 38b is disposed concentrically with the inner ring 38a, and has an outer ring raceway surface 38b1 formed in a central part of its inner periphery in the axial direction. The outer ring raceway surface 38b1 is disposed in such a manner that it faces the inner ring raceway surface 38a1. Moreover, the outer ring 38b has a pair of outer ring rib portions 38b2 formed on both sides in the axial direction. The outer ring rib portions 38b2 are so formed as to protrude from both end portions of the inner periphery of the outer ring 38b in the axial direction toward the inside in the radial direction, and the end surfaces of the cylindrical rollers 38c are in sliding contact with the outer ring rib portions 38b2.

The cylindrical rollers 38c are rollably disposed between the inner ring raceway surface 38a1 and the outer ring raceway surface 38b1.

The cage 38d has a pair of annular portions 38d1 disposed in such a manner that they are separated in the axial direction and a plurality of strut portions 38d2 spaced uniformly in the circumferential direction of the annular portions 38d1 and coupling the annular portions 38d1 together. Between the pair of annular portions 38d1 and the adjoining strut portions 38d2, pockets 38d3 are formed, respectively, and in the pockets 38d3, the cylindrical rollers 38c are disposed, respectively. In the large-size wind power generation device 1, since a high load is applied to the rolling bearing supporting the output shaft 35 of the speed increaser 3, it is preferable to use the roller bearing 38 that is high in rigidity and capable of suitably absorbing the axial expansion and contraction of the output shaft 35 due to heat. Here, as the rolling bearing, a ball bearing or a tapered roller bearing may be used.

In FIG. 2, the wind power generation device 1 is provided with a joint device (joint structure, coupling) 9 provided between the output shaft 35 of the speed increaser 3 and the input shaft 41 of the power generator 4 and for enabling the torque to be transmitted between the output shaft 35 and the input shaft 41. In the present embodiment, while a one-way clutch 7 is provided on the joint device 9, the joint device 9 is provided on the speed increaser 3 side of the brake 44 for the input shaft 41.

Figure 4:
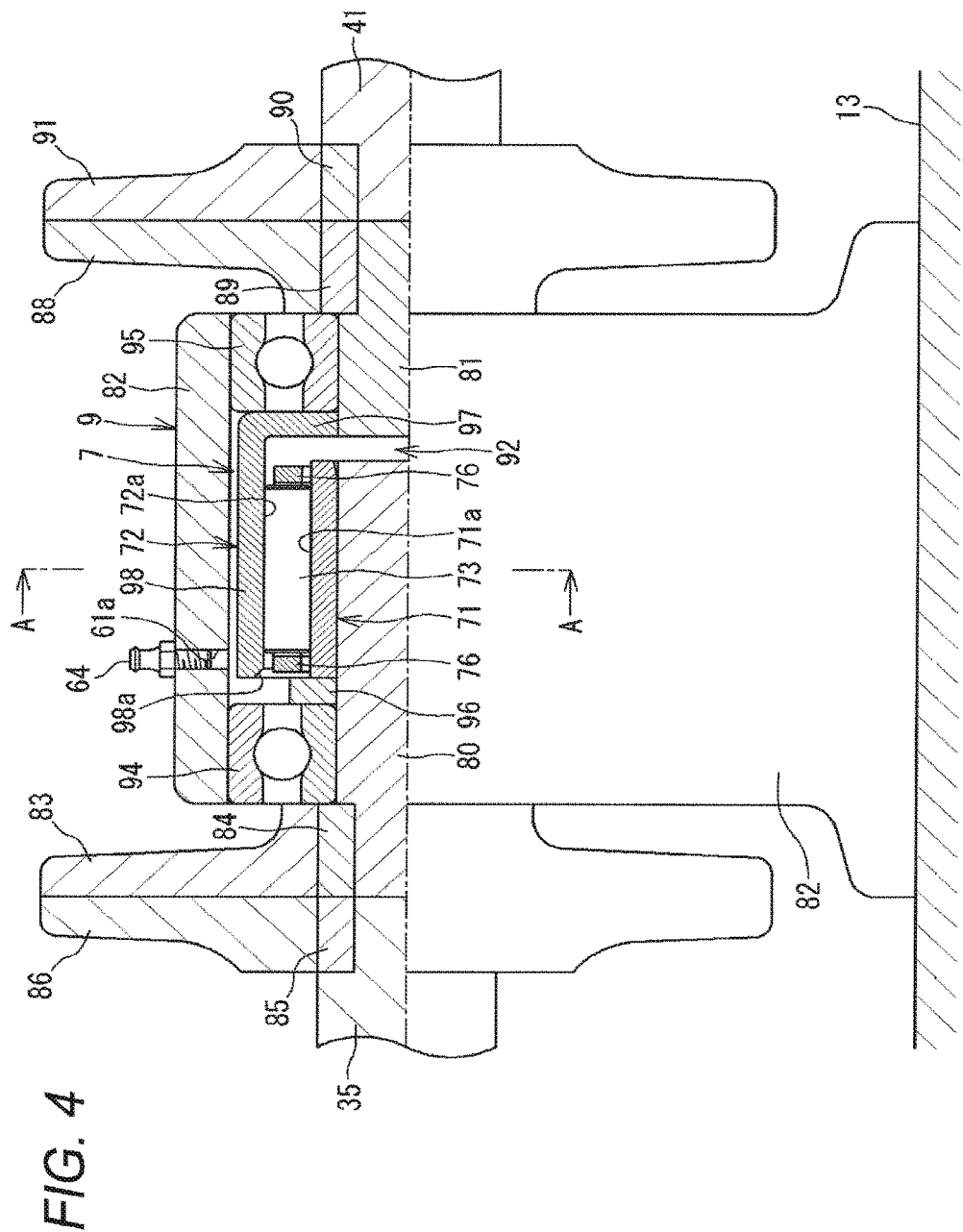
FIG. 4 is a half cross-sectional view showing the joint device.
Figure 5:
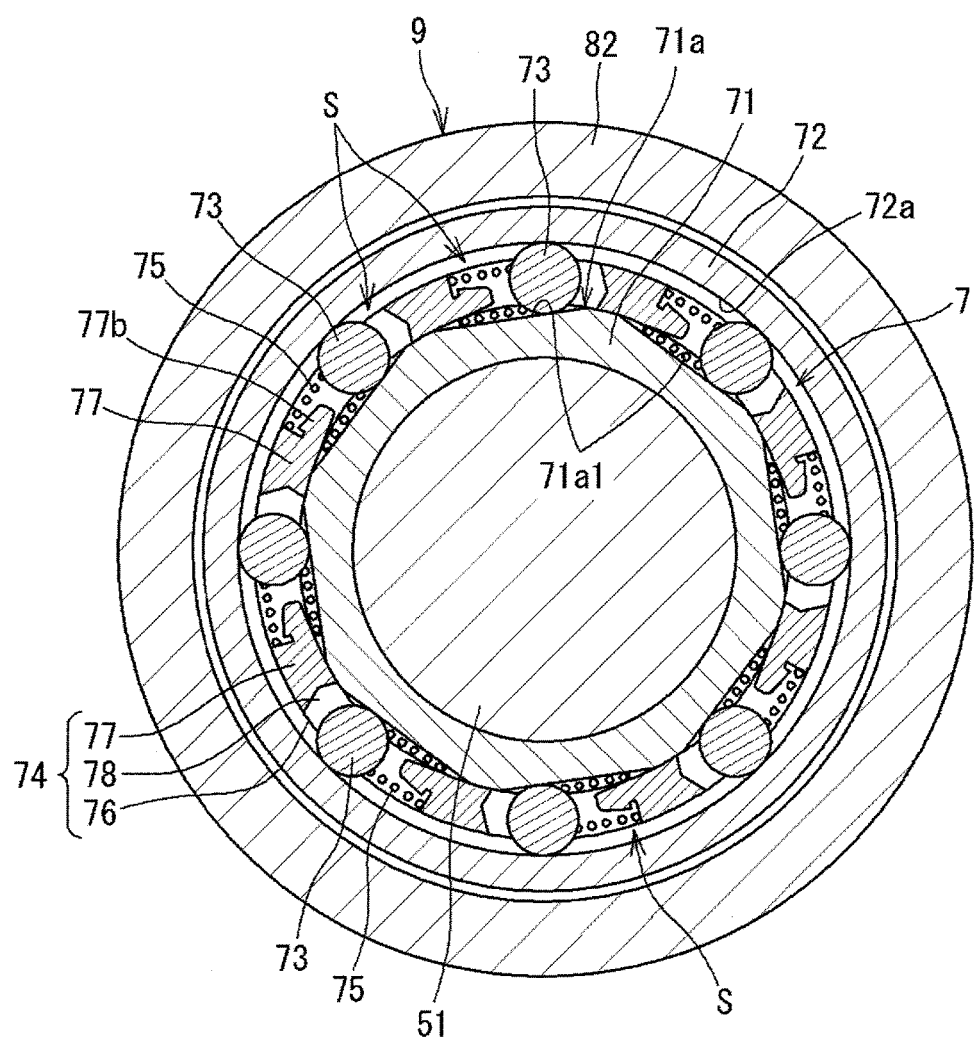
FIG. 5 is a cross-sectional view taken on the arrow A in FIG. 4.

FIG. 4 is a half cross-sectional view showing the joint device 9, and FIG. 5 is a cross-sectional view taken on the arrow A in FIG. 4.

In FIG. 4 and FIG. 5, the joint device 9 has an output side transmission shaft 80, an input side transmission shaft 81, a fixed housing 82, an output side transmission shaft bearing 94, an input side transmission shaft bearing 95, the one-way clutch 7 and a grease nipple 64.

The output side transmission shaft 80 is disposed concentrically with the output shaft 35, a flange 83 is fixed to the input side end portion thereof by a key 84 or the like, and to this flange 83, a flange 86 fixed to the output shaft 35 by a key 85 or the like is fixed by a bolt/nut (not shown).

The input side transmission shaft 81 is disposed concentrically with the input shaft 41 and the output side transmission shaft 80, a flange 88 is fixed to the output side end portion thereof by a key 89 or the like, and to this flange 88, a flange 91 fixed to the input shaft 41 by a key 90 or the like is fixed by a bolt/nut (not shown). A clearance 92 of, for example, approximately 10 mm is provided in the axial direction between the input side end portion of the input side transmission shaft 81 and the output side end portion of the output side transmission shaft 80. By this clearance 92, fabrication (assembly) errors of the joint device 9 are absorbed and expansion (expansion and contraction) of the output side transmission shaft 80 and the input side transmission shaft 81 due to temperature rise (change) are handled.

The fixed housing 82 is a structural object of a machine room is placed and fixed to the floor surface of the nacelle 13 by a bolt/nut (not shown) or the like, the nacelle 13 being a structural object of a machine room where the speed increaser 3 and power generator 4 of the wind power generation device 1 are placed. In the fixed housing 82, the output side transmission shaft 80 and the input side transmission shaft 81 are inserted, and these shafts 80 and 81 are separately supported by the fixed housing 82 through the output side transmission shaft bearing 94 and the input side transmission shaft bearing 95 disposed in the axial direction. These bearings 94 and 95 are disposed on the end portions on the sides of the flanges 83 and 88 on the fixed housing 82, respectively. As the shafts 94 and 95, a ball bearing and a roller bearing are used.

The one-way clutch 7 is situated between the output side transmission shaft 80 and the input side transmission shaft 81 and between the output side transmission shaft bearing 94 and the input side transmission shaft bearing 95. The one-way clutch 7 is provided with an inner ring 71, an outer ring 72 and a plurality of rollers (engagement elements) 73 disposed between an outer peripheral surface 71a of the inner ring 71 and an inner peripheral surface 72a of the outer ring 72. The inner ring 71 is press-fitted in the output side end portion of the output side transmission shaft 80 and fixed by a screw, a key or the like, and a washer (spacer) 96 is fitted between the inner ring 71 and the output side transmission shaft bearing 94 in the output side transmission shaft 80. The outer ring 72 is fixed to the input side end portion of the input side transmission shaft 81 by a screw, a key or the like. When the inner ring 71 is fixed to the output side transmission shaft 80 and when the outer ring 72 is fixed to the input side transmission shaft 81, the inner ring 71 and the like are sometimes structurally fixed to the output side transmission shaft 80 and the like by forming a spline shaft, a spline hole or the like on the above-mentioned member without the use of a key or the like. Moreover, a structure is sometimes adopted in which the inner ring 71 is provided on the input side transmission shaft 81 and the outer ring 72 is provided on the output side transmission shaft 80. The outer ring 72 has an annular radially extending portion (radially protruding portion) 97 extending (protruding) outward from the input side transmission shaft 81 in the radial direction and a cylindrical axially extending portion (axially protruding portion) 98 extending (protruding) in the axial direction on the side of the output shaft 35 from the end portion on the outer side in the radial direction on the radially extending portion 97 and facing the inner ring 71 in the radial direction. On the inner peripheral surface of the leading end portion (the end portion on the side of the output shaft 35) of the axially extending portion 98, an assembly taper 98a for facilitating the assembly of the rollers 73 is formed. Considering load transmission and support, the material thickness of the radially extending portion 97 is made larger than the axially extending portion 98. The rollers 73 are formed in a cylindrical shape in the present embodiment, and provided eight in number in the circumferential direction.

In the fixed housing 82, a grease (lubricant) for lubricating the one-way clutch 7, the output side transmission shaft bearing 94 and the input side transmission shaft bearing 95 disposed thereinside is filled. The fixed housing 82 has an oiling hole 61 a formed so as to pass therethrough in the radial direction from the outer peripheral surface to the inner peripheral surface thereof (the sealing space), and to the oiling hole 61a, the grease nipple (fill opening with a check valve) 64 is attached. The oiling hole 61 a is provided in a plurality of positions in the circumferential direction, for example, in four positions at even intervals in the circumferential direction, and the grease can be supplied into the sealing space from any of the oiling holes 61a. Moreover, when the grease is supplied from any of the oiling holes 61a, by detaching the grease nipples 64 of the other oiling holes 61a, old grease can be discharged from the other oiling holes 61a. Thus, the oiling holes 61a has not only the function as the grease supply portion but also the function as the discharge portion. While it is preferable to use, as the grease, one using ester as the base oil and a urea material or the like as the thicker and insusceptible to temperature changes, the present invention is not limited thereto. While the grease nipple 64 is disposed radially outside the outer ring 72 in FIG. 4, the present invention is not limited to this position. For example, the grease nipple 64 may be disposed between the outer ring of the output side transmission shaft bearing 94 and the outer ring 72 and radially outside the washer 96. On the outside end portions in the radial direction of the output side transmission shaft bearing 94 and the input side transmission shaft bearing 95, that is, on the flange 83 side end portion of the output side transmission shaft bearing 94 and the flange 88 side end portion of the input side transmission shaft bearing 95, sealing members (not shown) are disposed, respectively.

According to the joint device as described above, although the one-way clutch 7 connects the output side transmission shaft 80 and the input side transmission shaft 81 in such a manner as to be integrally rotatable and releases this connection, since these shafts 80 and 81 are supported through the output side transmission shaft bearing 94 and the input side transmission shaft bearing 95 by the fixed housing 82 placed on the floor of the nacelle 13, the load of the one-way clutch 7 can be sufficiently supported by the nacelle 13. Therefore, the one-way clutch 7 and the like can be smoothly operated without the joint device 9 largely bending at the part of the one-way clutch 7 to apply a high mechanical load to the one-way clutch and the like.

Further describing the one-way clutch 7, a ring-shaped cage 74 holding the rollers 73 at predetermined intervals in the circumferential direction and a plurality of elastic members (pushing members) 75 elastically pushing the rollers 73 in one direction are further provided.

Figure 7:
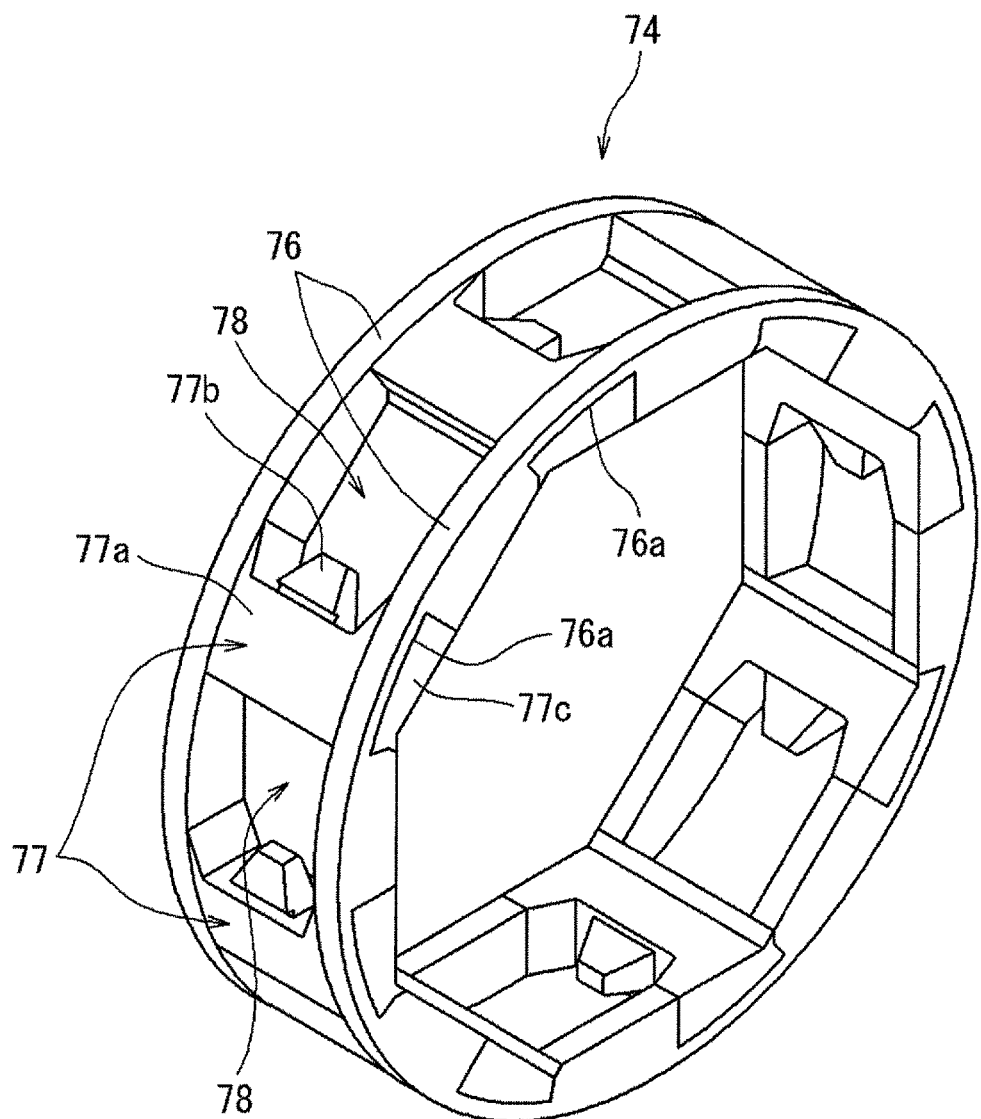
FIG. 7 is a perspective view showing a cage of the one-way clutch.

FIG. 7 is a perspective view showing the cage of the one-way clutch 7. In FIG. 7, the cage 74 has a pair of ring-shaped portions 76 facing each other in the axial direction and a plurality of strut portions 77 separate from these ring-shaped portions 76 and both axial end portions of which are fitted on the ring-shaped portions 76. Pockets 78 are formed by spaces surrounded by the ring-shaped portions 76 and the circumferentially adjoining strut portions 77, and the rollers 73 are individually accommodated in the pockets 78, respectively (see FIG. 5).

The ring-shaped portions 76 are made of a metallic material such as carbon steel or aluminum, and for example, the outer diameter is set to 300 mm, and the thickness in the axial direction, to 15 mm. On the inner peripheries of the ring-shaped portions 76, a plurality of concave portions 76a are formed at predetermined intervals in the circumferential direction.

The strut portion 77 has a main portion 77a, a protruding portion 77b provided so as to protrude on one end surface of the main portion 77a in the circumferential direction and a pair of fitted portions 77c formed on both end portions of the main portion 77a in the axial direction. The main portion 77a, the protruding portion 77b and the fitted portions 77c are integrally molded by injection molding of a synthetic resin material.

The protruding portion 77b, as shown in FIG. 5, guides (positions) the elastic members 75 accommodated in the pocket 78. Specifically, the protruding portion 77b is formed so as to be gradually tapered toward the end. The elastic members 75 are loosely fitted from the end side of the protruding portion 77b. The elastic members 75 are formed of compression coil springs formed so as to elongate in the axial direction. Here, the elastic members 75 may be springs of a different form such as leaf springs.

As shown in FIG. 7, the fitted portions 77c are formed so that the radial thickness thereof is smaller than that of the main portion 77a, and the thickness of the fitted portions 77c is set so that the outer peripheral surface of the ring-shaped portion 76 and the outer peripheral surface of the main portion 77a are substantially flush with each other under a condition where the fitted portions 77c are fitted in the concave portions 76a.

As described above, the cage 74 is formed of the ring-shaped portions 76 and the strut portions 77 and these are formed separately from each other, so that the ring-shaped portions 76 and the strut portions 77 can be manufactured individually. Consequently, the cage 74 can be easily manufactured compared with when the entire cage 74 is integrally manufactured. In particular, since the cage 74 used for the wind power generation device 1 is large in size and it is difficult to manufacture the whole thereof integrally, forming the ring-shaped portions 76 and the strut portions 77 separately from each other is more beneficial. Moreover, by making the ring-shaped portions 76 of a metal, a sufficient strength can be ensured for the cage 74, and by making the strut portions 77 of a synthetic resin, the overall weight of the cage 74 can be reduced.

As shown in FIG. 5, flat cam surfaces 71a1 of the same number (eight) as that of the rollers 73 are formed on the outer peripheral surface 71a of the inner ring 71, and the inner peripheral surface 72a of the outer ring 72 is a cylindrical surface. Between the cam surfaces 71a1 of the inner ring 71 and the inner peripheral surface 72a of the outer ring 72, a plurality of (eight) wedge-shaped spaces S are formed in the circumferential direction.

Figure 6:
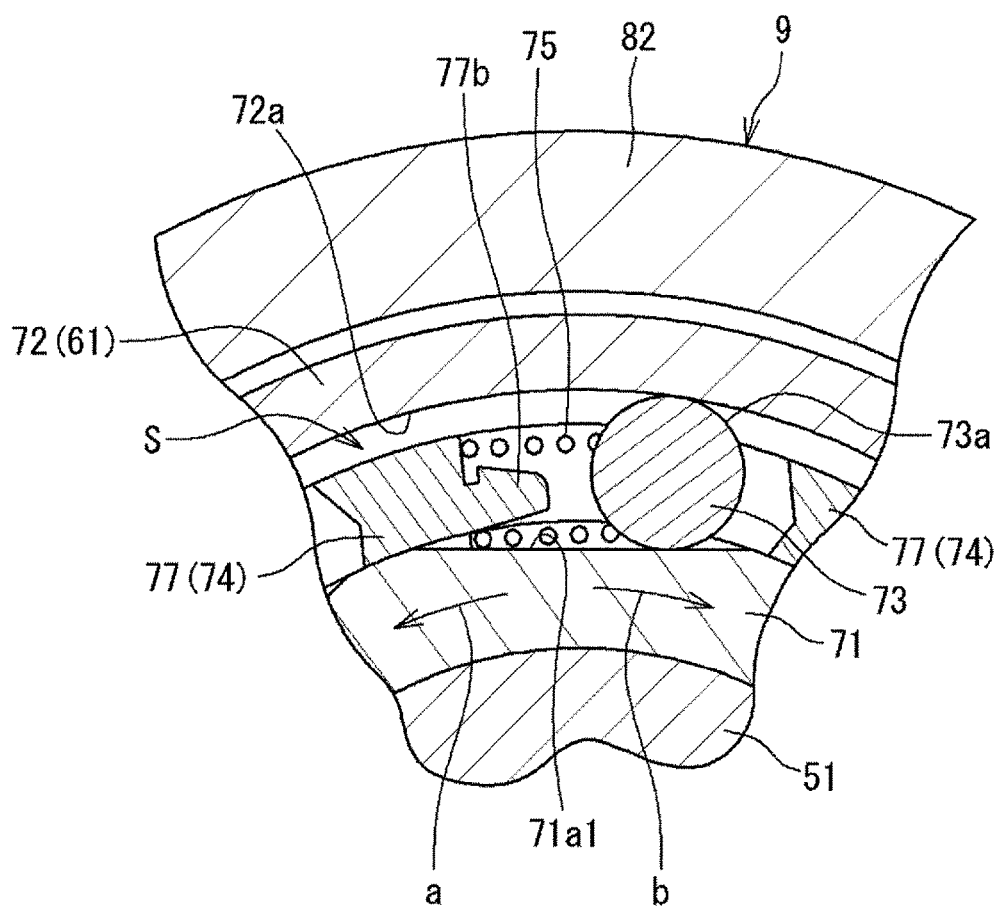
FIG. 6 is a cross-sectional view showing an enlargement of a relevant part of a one-way clutch.

FIG. 6 is a cross-sectional view showing an enlargement of a relevant part of the one-way clutch.

The rollers 73 are individually disposed in the wedge-shaped spaces S, respectively. Moreover, the rollers 73 are pushed by the elastic members 75 in a direction in which the wedge-shaped spaces S become narrower. The outer peripheral surface of each roller 73 is a contact surface 73a that is in contact with the cam surface 71a1 of the inner ring 71 and the inner peripheral surface 72a of the outer ring 72, and this contact surface 73a is formed straightly in the width direction (the axial direction).

In the one-way clutch 7 structured as described above, when the rotation speed of the output side transmission shaft 80 is higher than the rotation speed of the input side transmission shaft 81 by the output side transmission shaft 80 rotating with increasing speed, the inner ring 71 behaves so as to relatively rotate in one direction (the counterclockwise direction in FIG. 5; the direction of the arrow a in FIG. 6) with respect to the outer ring 72. In this case, by the pressing force of the elastic members 75, the rollers 73 slightly move in a direction in which the wedge-shaped spaces S become narrower (rightward in FIG. 6) so that the contact surfaces 73a of the rollers 73 are in pressure contact with the outer peripheral surface 71a (the cam surface 71a1; meshed surface) of the inner ring 71 and the inner peripheral surface (meshed surface) 72a of the outer ring 72, which results in a condition where the rollers 73 are meshed between the inner and outer rings 71 and 72. This enables the inner and outer rings 71 and 72 to integrally rotate in the one direction a, so that the output side transmission shaft 80 and the input side transmission shaft 81 can be integrally rotatably connected.

Moreover, when the rotation of the output side transmission shaft 80, that is, the output shaft 35 becomes a constant speed rotation after the rotation with increasing speed and the rotation speed of the output side transmission shaft 80 becomes the same as the rotation speed of the input side transmission shaft 81, that is, the input shaft 41, the rollers 73 are held in a state of being meshed between the inner and outer rings 71 and 72. For this reason, the one-way clutch 7 maintains the integral rotation of the inner and outer rings 71 and 72 in the one direction, so that the output side transmission shaft 80 and the input side transmission shaft 81 continue to rotate integrally.

On the other hand, when the rotation speed of the output side transmission shaft 80 is lower than the rotation speed of the input side transmission shaft 81 by the output side transmission shaft 80 rotating with decreasing speed, the inner ring 71 behaves so as to relatively rotate in the other direction (the clockwise direction in FIG. 5; the direction of the arrow b in FIG. 6) with respect to the outer ring 72. In this case, the meshing between the rollers 73 and the inner and outer rings 71 and 72 is released by the rollers 73 slightly moving in a direction in which the wedge-shaped spaces S become wider against the pressing force of the elastic members 75. As described above, the output side transmission shaft 80 and the input side transmission shaft 81 are disconnected by the meshing of the rollers 73 being released.

While the outer ring inner peripheral surface 72a forming the wedge-shaped spaces S is formed of part (arc surface) of a cylindrical surface continuous in the circumferential direction, it may be formed of an arc surface not continuous in the circumferential direction, for example, an independent arc surface such that a flat surface or an inflection point is interposed between the outer ring inner peripheral surfaces 72a of the wedge-shaped spaces S adjoining in the circumferential direction.

The inner ring 71 of the one-way clutch 7 is fitted on the output side transmission shaft 80 by interference fit with a predetermined interference. Consequently, these are integrally rotatable by the tightening force of the inner ring 71 on the output side transmission shaft 80. Moreover, the tightening force of the inner ring 71 on the output side transmission shaft 80 is increased by the meshing between the rollers 73 and the inner and outer rings 71 and 72. Hereinafter, this action will be described in detail.

Figure 8A:
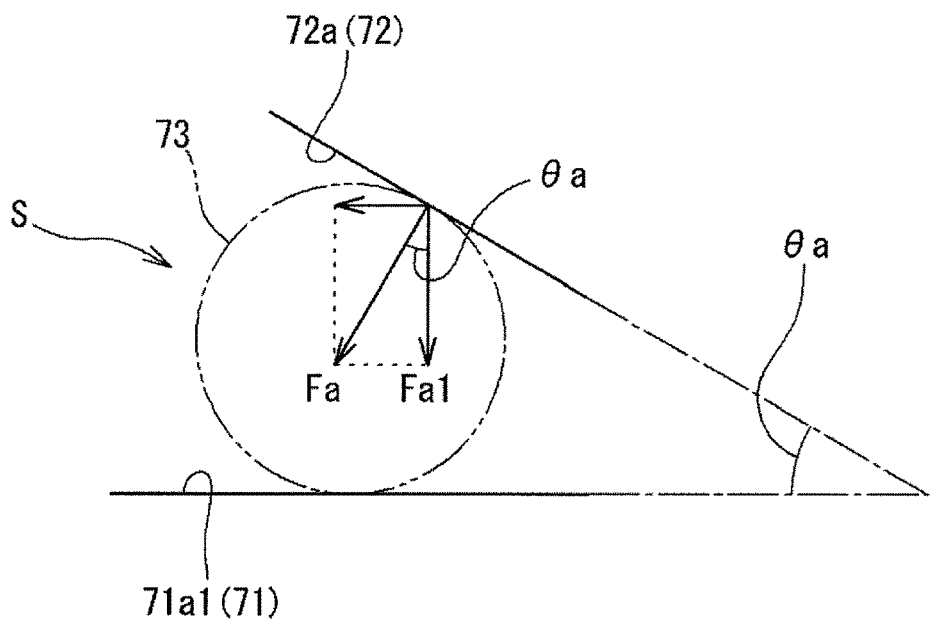
FIG. 8($a$) and FIG. 8($b$) are explanatory views explaining the action of the one-way clutch.
Figure 8B:
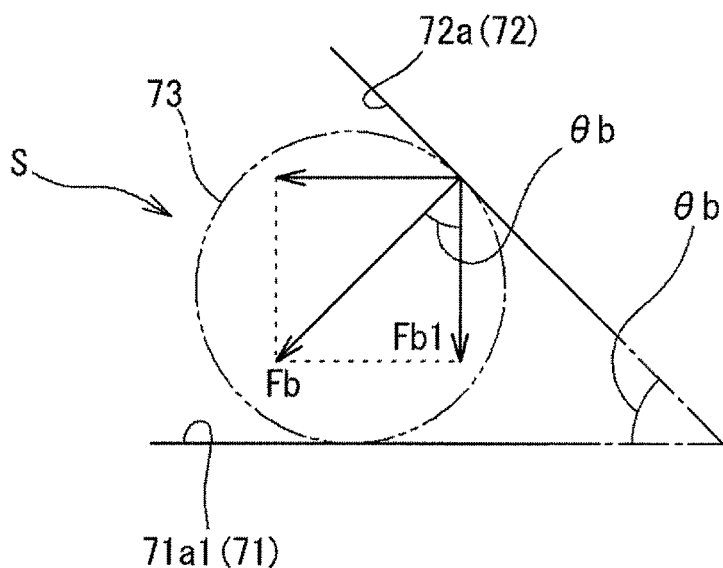

As shown in FIG. 6, when the inner ring 71 behaves so as to relatively rotate in the direction of the arrow a in FIG. 6 with respect to the outer ring 72, the rollers 73 mesh with the cam surface 71a1 and the outer ring inner peripheral surface 72a, the rollers 73 receive loads Fa and Fb from the outer ring inner peripheral surface 72a as shown in FIGS. 8(a) and 8(b), and the cam surface 71a1 of the inner ring 71 receives vertical component loads Fa1 and Fb1 which are component forces of the loads Fa and Fb from the rollers 73. Consequently, the tightening force of the inner ring 71 on the output side transmission shaft 80 is increased by these vertical component loads Fa1 and Fb1.

For this reason, a torque (transmission torque) T2 transmittable from the output side transmission shaft 80 to the inner ring 71 by the tightening force by the fitting between the output side transmission shaft 80 and the inner ring 71 (hereinafter, referred to as "initial tightening force") can be made lower than the maximum transmission torque T1max to be transmitted from the output side transmission shaft 80 to the inner ring 71 when the load torque (the power generation torque or the inertia torque for rotating the rotor 42 of the power generator 4) for operating the wind power generation device 1 becomes maximum. That is, T2 and T1max can be set to the following relationship:

$$T1max > T2 \qquad (1)$$

Moreover, when the transmission torque transmittable from the output side transmission shaft 80 to the inner ring 71 by the tightening force by the meshing between the rollers 73 and the inner and outer rings 71 and 72 (hereinafter, also referred to as "additional tightening force") is T3, the value obtained by adding T2 and T3 is always higher than a minimum transmission torque T1 necessary for operating the wind power generation device 1. That is, $$T1 < T2 + T3 \qquad (2)$$

In particular, by the additional tightening force when the load torque is maximum, a transmission torque T3max transmittable from the output side transmission shaft 80 to the inner ring 71 satisfies the following condition:

$$T1max < T2 + T3max \qquad (3)$$

Figure 9:
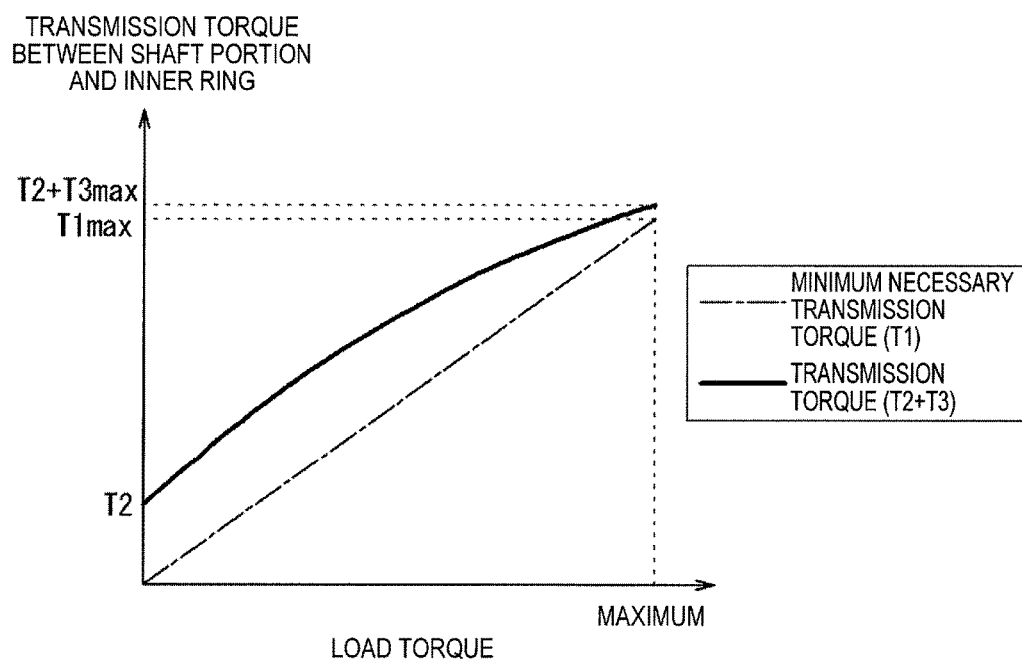
FIG. 9 is a graph explaining the relationship between the load torque and the transmission torque.

The relationship between the load torque and the transmission torques T1 to T3 is as shown by the graph in FIG. 9. The above-mentioned maximum load torque is a maximum load torque assumed as a design condition of the wind power generation device 1 and is not an excessive load torque caused at times such as when the wind power generation device 1 suffers a breakdown or when abrupt wind speed fluctuations exceeding assumptions occur due to an abnormal weather.

By the relationships of the above (1) to (3) being satisfied, the initial tightening force by the fitting between the output side transmission shaft 80 and the inner ring 71 can be minimized, the interference necessary for the fitting therebetween is reduced, and the internal stress (particularly, the stress in the circumferential direction) caused on the inner ring 71 by the fitting can be reduced. By reducing the internal stress of the inner ring 71, the durability of the inner ring 71 is enhanced, and the life of the one-way clutch 7, consequently, the joint device 9 can be enhanced. The interference between the output side transmission shaft 80 and the inner ring 71 may be 10 μm at the minimum.

By omitting the inner ring 71 of the one-way clutch 7 and forming a cam surface directly on the output side transmission shaft 80, the stress concentration on the inner ring 71 accompanying the fitting as described above can be suppressed, which is favorable. However, since the one-way clutch 7 used for the wind power generation device 1 as in the present embodiment is large in size, forming a cam surface directly on the input side transmission shaft 81 is difficult and impractical. Therefore, it is most effective to set the relationship between the transmission torques T1 to T3 and the load torque like the above (1) to (3).

On the other hand, when the tightening force due to the meshing between the rollers 73 and the inner and outer rings 71 and 72 becomes excessively high with an increase in the load torque, the burden on the inner ring 71 becomes heavy, so that the durability can rather decrease. For this reason, in the present embodiment, as the load torque increases, the increment of the vertical component load applied from the rollers 73 to the inner ring 71 (the cam surface 71a1) with respect to the increment of the load torque is decreased so that the burden on the inner ring 71 can be minimized.

Specifically, since the outer ring inner peripheral surface 72a is formed as an arc surface as shown in FIG. 6, the wedge angle is larger in an area where the wedge-shaped space S is smaller. FIG. 8(a) shows a condition where the roller 73 is situated in an area where the wedge-shaped space S is comparatively large and the wedge angle θa is small, and FIG. 8(b) shows a condition where the roller 73 is situated in an area where the wedge-shaped space S is comparatively small and the wedge angle θb is large.

Moreover, the time when the roller 73 is situated in an area where the wedge-shaped space S is large is in the early stage of the meshing between the roller 73 and the inner and outer rings 71 and 72, for example, in cases where the load torque is low such as when the cut-in wind speed (the minimum wind speed necessary for power generation) is reached from the non-rotating condition to start rotation and when the rotation becomes constant at the cut-in wind speed and stable, and the time when the roller 73 is situated in an area where the wedge-shaped space S is small is in cases where the load torque is high such as when the wind speed becomes not less than the rated wind speed and reaches the rated output. The cut-in wind speed may be an instantaneous wind speed or may be the average wind speed for a predetermined time.

Therefore, in FIGS. 8(a) and 8(b), the loads Fa and Fb applied from the outer ring inner peripheral surface 72a to the rollers 73 have the following relationship:

$$Fa < Fb \quad (4)$$

In FIG. 8(b), the percentage of the vertical component load Fb1 to the load Fb applied from the outer ring inner peripheral surface 72a to the roller 73 (Fb/Fb1) is, in FIG. 8(a), lower than the percentage of the vertical component load Fa1 to the load Fa (Fa/Fa1). For this reason, even if the load torque increases, the vertical component load Fb1 does not become very high, so that the burden on the inner ring 71 can be reduced.

The wedge angle θa when the initial load torque of the meshing between the rollers 73 and the inner and outer rings 71 and 72 acts and the wedge angle θb when the maximum load torque acts are set to the following relationship:

$$1.0° < \theta b - \theta a < 1.5° \quad (5)$$

The wedge angle θa is preferably in a range of 4° to 9°, and the wedge angle θb is preferably in a range of 5.5° to 10°. This is because if the wedge angle θa is smaller than 4°, there is a possibility that the vertical component load Fa1 applied from the rollers 73 to the cam surface 71a1 is higher than necessary and if the wedge angle θa is higher than 9°, the other wedge angle θb is too large so that there is a possibility that the meshing between the rollers 73 and the peripheral surfaces are insufficient. Moreover, this is because if the wedge angle θb is smaller than 5.5°, the other wedge angle θa is too small so that there is a possibility that the vertical component load Fa1 applied from the rollers 73 to the cam surface 71a1 is enhanced more than necessary and if the wedge angle θb is higher than 10°, there is a possibility that the meshing between the rollers 73 and the inner and outer rings 71 and 72 is insufficient.

Moreover, the ratio between the wedge angles θa and θb is set to $$1.1 < \theta b/\theta a < 1.4 \quad (6)$$

(more preferably, 1.11 < θb/θa < 1.38).

By the wedge angles θa and θb being set to the above relationship, during the period from the early stage of the meshing between the rollers 73, and the inner ring 71 and the outer ring 72 to when the load torque becomes maximum, the torque transmission between the output side transmission shaft 80 and the inner ring 71 can be performed with reliability and the burden on the inner ring 71 can be reduced.

The relationships like the above (5) and (6) can be set by adjusting the inside diameter of the outer ring 72, the outside diameter and P.C.D. of the rollers 73, the distance between the outer ring inner peripheral surface 72a and the cam surface 71a1 and the like. Moreover, it is preferable to set the number of rollers 73 of the one-way clutch 7 to four to eight. This is because if the number of rollers 73 is larger than eight, the loads Fa and Fb from the outer ring inner peripheral surface 72a to the rollers 73 are dispersed, the vertical component loads Fa1 and Fb1 from the rollers 73 to the cam surface 71a1 are low and there is a possibility that the tightening force of the inner ring 71 on the output side transmission shaft 80 cannot be sufficiently obtained. Moreover, this is because if the number of rollers 73 is smaller than four, the tightening force of the inner ring 71 on the output side transmission shaft 80 is too high and a local burden on the inner ring 71 is heavy.

The present invention is not limited to the above-described embodiment and may be modified as appropriate when carried out. For example, while the one-way clutch is of a type facing in the radial direction in the above-described embodiment, the one-way clutch may be of the thrust type. Moreover, the wind power generation device is not limited to a horizontal axis type device shown in FIG. 1 but may be a vertical axis type device.

The present application is based upon Japanese Patent Application (Patent Application No. 2013-223297) filed on Oct. 28, 2013, the contents of which are incorporated herein by reference.

DESCRIPTION OF REFERENCE SIGNS

1: Wind Power Generation Device; 2: Main Shaft; 3: Speed Increaser; 4: Power Generator; 7: One-Way Clutch; 9: Joint Device (Joint Structure); 13: Nacelle; 35: Output Shaft; 41: Input Shaft; 71: Inner Ring; 72: Outer Ring; 73: Roller (Engagement Element); 80: Output Side Transmission Shaft; 81: Input Side Transmission Shaft; 82: Fixed Housing; 94: Output Side Transmission Shaft Bearing; 95: Input Side Transmission Shaft Bearing; 97: Radially Extending Portion; 98: Axially Extending Portion.

The invention claimed is:

1. A wind power generation device comprising:
a main shaft which rotates by wind power;
a speed increaser which increases a rotation speed of the main shaft and outputs a rotation from an output shaft;
a power generator which comprises an input shaft rotating with the rotation of the output shaft as an input, and which generates power with the rotation of the input shaft; and a joint structure which is provided between the output shaft and the input shaft for enabling a torque to be transmitted between the output shaft and the input shaft, the joint structure comprising:

an output side transmission shaft which rotates integrally with the output shaft;

an input side transmission shaft which rotates integrally with the input shaft;

a fixed housing fixed to a structural object of a machine room where the speed increaser and the power generator are placed;

a plurality of bearings which support, by the fixed housing, the output side transmission shaft and the input side transmission shaft inserted in the fixed housing; and a one-way clutch which is fitted in the fixed housing, which integrally rotatably connects the output side transmission shaft and the input side transmission shaft, and which releases the connection, wherein the one-way clutch integrally rotatably connects the output side transmission shaft and the input side transmission shaft under a condition where a rotation speed of the output shaft is higher than a rotation speed of the input shaft, and releases the connection between the output side transmission shaft and the input side transmission shaft under a condition where the rotation speed of the output shaft is lower than the rotation speed of the input shaft, wherein the structural object of the machine room includes a nacelle, and the output side transmission shaft and the input side transmission shaft are supported through the plurality of bearings by the fixed housing placed on a floor of the nacelle, wherein the one-way clutch comprises:

an inner ring portion which rotates integrally with a first shaft that is one of the output side transmission shaft and the input side transmission shaft;

an outer ring fixed to a second shaft which is an other of the output side transmission shaft and the input side transmission shaft; and an engagement element disposed between the inner ring portion and the outer ring, and wherein the inner ring portion is fitted on the first shaft by interference fit.

2. The wind power generation device according to claim 1, wherein the output side transmission shaft and the input side transmission shaft are disposed concentrically with each other, and wherein the output side transmission shaft and the input side transmission shaft are separately supported by the fixed housing through an output side transmission shaft bearing and an input side transmission shaft bearing, respectively.

3. The wind power generation device according to claim 2, wherein the outer ring comprises:

a radially extending portion which extends outward in a radial direction from the other shaft; and an axially extending portion which extends in an axial direction from an end portion of the radially extending portion on an outer side in the radial direction and which faces the inner ring portion in the radial direction.

4. The wind power generation device according to claim 1, wherein the outer ring comprises:

a radially extending portion which extends outward in a radial direction from the other shaft; and an axially extending portion which extends in an axial direction from an end portion of the radially extending portion on an outer side in the radial direction and which faces the inner ring portion in the radial direction.

5. The wind power generation device according to claim 1, wherein relationships (1)-(3) are satisfied:

$$T1\max > T2 \qquad (1)$$

$$T1 < T2 + T3 \qquad (2)$$

$$T1\max < T2 + T3\max \qquad (3),$$

where:

T1 is a minimum transmission torque necessary for operating the wind power generation device;

T1max is a maximum transmission torque to be transmitted from the first shaft to the inner ring portion when a load torque for operating the wind power generation device becomes maximum;

T2 is a transmission torque transmittable from the first shaft to the inner ring portion by a first tightening force by the fitting between the first shaft and the inner ring portion;

T3 is a transmission torque transmittable from the first shaft to the inner ring portion by a second tightening force by a meshing between: the engagement element; and the inner ring portion and the outer ring; and T3max is a transmission torque transmittable from the first shaft to the inner ring by the second tightening force when the load torque is maximum.

* * * * *